(12) United States Patent
Kirmse et al.

(10) Patent No.: US 8,825,383 B1
(45) Date of Patent: Sep. 2, 2014

(54) EXTRACTING PATTERNS FROM LOCATION HISTORY

(75) Inventors: Andrew Kirmse, Redwood City, CA (US); Tushar Udeshi, Broomfield, CO (US); Pablo Bellver, Redwood City, CA (US); James Shuma, San Jose, CA (US); Matthieu Devin, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 73 days.

(21) Appl. No.: 13/116,866

(22) Filed: May 26, 2011

Related U.S. Application Data

(60) Provisional application No. 61/422,060, filed on Dec. 10, 2010.

(51) Int. Cl.
*G01C 21/34* (2006.01)

(52) U.S. Cl.
USPC .......................... 701/426; 701/467; 701/521

(58) Field of Classification Search
USPC ................................................ 701/400–541
See application file for complete search history.

(56) References Cited

U.S. PATENT DOCUMENTS

| | | | |
|---|---|---|---|
| 7,424,363 B2 * | 9/2008 | Cheng et al. ................... | 701/431 |
| 8,239,130 B1 * | 8/2012 | Upstill et al. .................. | 701/426 |
| 2006/0265119 A1 * | 11/2006 | McMahan et al. ............. | 701/209 |
| 2007/0156334 A1 * | 7/2007 | Vu ................................. | 701/209 |
| 2009/0063045 A1 * | 3/2009 | Figueroa et al. ............... | 701/210 |
| 2011/0106429 A1 * | 5/2011 | Poppen et al. ................. | 701/201 |
| 2011/0276565 A1 * | 11/2011 | Zheng et al. ................... | 707/724 |
| 2012/0123678 A1 * | 5/2012 | Poppen et al. ................. | 701/468 |

* cited by examiner

*Primary Examiner* — Helal A Algahaim
*Assistant Examiner* — Charles J Han
(74) *Attorney, Agent, or Firm* — McDermott Will & Emery LLP

(57) ABSTRACT

Embodiments relate to determining commute routes and clustering commute routes from a user's location history. Points in the user's location history may be clustered to find the user's home and work locations. Additionally, points along the user's commute may be identified to determine the user's typical commute. Similar commutes can be clustered together, and used to suggest various services to the user.

20 Claims, 6 Drawing Sheets

EXTRACTING PATTERNS FROM LOCATION HISTORY

CROSS REFERENCE TO RELATED APPLICATIONS

This application claims the benefit of U.S. Provisional Appl. No. 61/422,060 filed Dec. 10, 2010, which is hereby incorporated by reference in its entirety.

BACKGROUND

1. Field

Embodiments relate generally to location-based services on mobile devices.

2. Background

Various location-based services utilize a check-in model to determine a user's location at various times. Such services require that the user take some action on a phone or other mobile device to announce that she has reached a particular location. The user can then advertise this fact to her friends and also to the business owner.

Other location-based services use a more passive model. A user's mobile device may periodically send the location of the mobile device to a server. An alert may be sent to the user if one of her registered friends is in close proximity. The user may also have the option to allow her location history to be saved. The location history may be analyzed and displayed for the user to see on a web site.

In order to preserve the user's privacy, passive location based services are implemented as an opt-in service. That is to say, the user must actively wish to have her mobile phone or other device transmit her location. The user may also control who can view her current location and location history. At any time, the user may opt-out and may be given the option to delete her location history.

BRIEF SUMMARY

Disclosed herein are methods, systems, and computer program products for normalizing commute routes by analyzing a user's location history. A source and destination point may be determined from a set of location points representing a user's location history. A route may be proposed by a routing server from the source to the destination. Intermediate waypoints along the user's route may be identified if the waypoints are outside a threshold distance from the route. A new route may be proposed that includes the intermediate waypoints.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
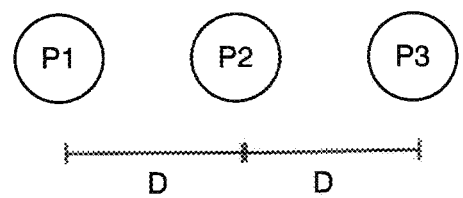
FIG. 1 is a diagram of exemplary location points.

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Introduction

Embodiments are directed to determining commute paths from a user's location history. For example, a user may be presented an option via a graphical user interface (GUI) on the user's mobile device to authorize tracking and recording the user's location (i.e., the user's mobile device location) over time. Assuming the user has enabled the option and thus granted permission, the user's location history can be used to provide several useful services. The user may also control who can view her current location and location history. At any time, the user may opt-out and may be given the option to delete her location history.

For example, the user's location history can be provided to a clustering algorithm to cluster the various locations to determine the places that the user frequents, and determine how much time is spent at each location. Further, the location history may be used to detect when the user is out of her "home zone" to detect trips that she has taken.

The location history may also be used to determine the routes the user frequently travels including, for example, routes the user takes for his or her daily commute to work. This analysis may be used to provide additional location-based services to the user including, for example and without limitation, real-time traffic services that may be used to alert the user of traffic on the user's expected route to work, and suggest an alternate route.

For each user, the location history may include a list of location points and associated time stamps. Each location point has a geographic location specified by, for example, latitude and longitude coordinates. The latitude and longitude coordinates can be derived based on one or more location input sources. Examples of such input sources include, but are not limited to, cell tower triangulation data, wi-fi signatures, and/or Global Positioning System (GPS) location data. Further, each derived location point may be associated with an accuracy radius based on the type of input source. For example, location points obtained by cell tower triangulation generally have an accuracy radius of 1000 meters. Points obtained by wi-fi signatures generally have an accuracy radius of 100 meters. Points obtained by a GPS device (e.g., coupled to or integrated with the user's mobile device) may have an accuracy radius of 10 meters.

Raw geolocations reported from mobile devices may contain errors beyond the measurable uncertainties of the above methods. For example, hardware or software bugs in the mobile device may induce spurious readings, or variations in signal strength or terrain may cause a phone to connect to a cell tower that is not physically closest to the device. Given a stream of input locations, various filtering mechanisms may be used to account for such errors.

For example, points that fall outside the boundaries of international time zones over land may be rejected. Further, points with timestamps occurring before a user opted to have her location data collected may be rejected. If two consecutive points imply a non-physically possible velocity, these points may be filtered out as well.

Further, any erroneous points that can be attributed to cases of "jitter" may also be filtered out. For example, erroneous points due to jitter may be collected for a user who is stationary over a period of time, but the reported location(s) of the user varies greatly over the same time period. Such cases of jitter may occur, for example, when gathering location data using cell tower triangulation and the user's mobile device were to determine its current location based on signals from a distant cell tower, or alternatively, from a distant wi-fi access point. Identifying jitter may include searching a sequence of consecutive locations $P_1$ through $P_n$, where $P_1$ and $P_n$ are within a small distance D of each other and have timestamps within a few hours of each other. Further, $P_1$ and $P_n$ have a high reported accuracy. If points $P_2$ through $P_{n-1}$ have a low reported accuracy and are farther than distance D from $P_1$, then points $P_2$ through $P_{n-1}$ may be identified as due to jitter.

Computing Frequently Visited Locations

Computing frequently visited places from a user's location history may be performed with the assistance of clustering algorithms. In order to compute such frequently visited places, points at which the user is known or believed to be stationary may be filtered into a collection of points. These points may represent when a user is either not moving or moving at a very low velocity.

One approach to computing frequently visited places may use leader based clustering. Leader based clustering uses the distance from a particular point to the current centroid of a cluster. For each point in the collection of points, it is determined whether the point belongs to an existing cluster by computing the distance between the point and the cluster centroid. If the distance is below a threshold radius, the point is added to a cluster. Clusters formed in this way may represent frequently visited places.

A disadvantage of leader-based clustering may be that the input order of points affects the clusters that are formed. For example, three points P1, P2, and P3, as illustrated in FIG. 1, which lie on a straight line with the same distance D between one another, may result in different clusters depending on their order. For example, the order of the points provided to the leader based clustering algorithm may result in two clusters {P1} and {P2, P3}, or one cluster, {P2, P1, P3}, based on the individual user's travel pattern.

In order to eliminate the disadvantages of leader-based clustering, mean-shift clustering may be used. Mean-shift clustering is an iterative procedure that moves each point to the average of the data points in its vicinity. Iterations terminate when all points move less than a given threshold. Mean-shift clustering is guaranteed to converge.

In mean-shift clustering, a weighted average may be used to compute the move position, where the weights are inversely proportional to the accuracy of the points. Thus, the points may gravitate towards higher accuracy points. For example, since points obtained using GPS are more accurate than points obtained using cell tower triangulation, an iteration of mean-shift clustering may gravitate towards points obtained using GPS. Once iterations converge, the points may be chosen as cluster centers. An input point within a threshold radius to the cluster center may be added to the cluster. If, for some reason, the iterations do not converge, leader-based clustering may be used.

Mean-shift clustering does not suffer from the input-order dependency suffered by leader-based clustering. For example, given the three points P1, P2 and P3, no matter the order, mean shift clustering will always return a cluster with all three points.

Figure 2:
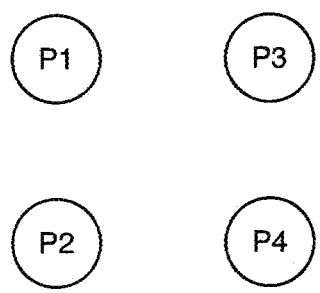
FIG. 2 is a another diagram of exemplary location points.

Generally, mean-shift clustering generates a smaller number of better located clusters, as compared to leader-based clustering. For example, consider the points shown in FIG. 2, which are arranged in a square shape. A leader-based clustering approach would generate four clusters, one per point. Mean-shift clustering would return only one clustering whose centroid is at the center of the square formed by the four points.

However, the iterative nature of mean-shift clustering makes the algorithm expensive. Thus, the number of iterations of the mean-shift clustering algorithm may be limited, and leader based clustering may be used if the algorithm does not converge.

In a further approach, adaptive radius clustering may be used. Both mean-shift clustering and leader-based clustering return clusters of input points. Clusters larger than a given threshold may be identified as interesting points. However, this may not be ideal, since the input points have varying levels of accuracy. For example, if three stationary GPS points exist within a close proximity of each other, a high confidence may exist that the user visited the particular location, as opposed to three stationary cellular tower points. Thus, in an embodiment, the clustering algorithms may be run multiple times. Each time the clustering algorithm is run, the desired radius and minimum cluster size are increased. When a particular cluster is generated, a check is performed to determine whether the cluster matches a previously-computed cluster generated from a smaller radius. If such a cluster exists, the previously-computed cluster is merged into the larger cluster. This technique may be used in both mean-shift clustering and leader-based clustering. Adaptive radius clustering may compute a greater number of correct clusters.

Once a user's location history is used to compute various clusters, a heuristic may be used to determine the user's home and work locations. A user is likely to be home at night. Thus, the user's points which occur at night may be filtered and clustered together. The largest cluster may represent the user's home location.

Similarly, the user's work location may be derived by clustering points which occur on weekdays, during the middle of the day. The largest cluster of such points may be deemed the work location.

The heuristic as described above may not work for users with non-standard schedules. Such users may be provided with the option to correct their home and work location in a given location based service.

Prior to clustering for visited places, additional filtering may be performed in embodiments. For example, points which are within a certain distance of home and work locations may be filtered out. Further, points on the user's commute between home and work may be filtered out. Further, points near airports may be filtered out since these may be reported as flights.

Without the above filters, spurious visited places may exist. Even when a given user is stationary at home or work, the location reported may jump around. Thus, for example, without filtering out points within a certain distance of home and work, multiple visited places near home and work may exist in the set of points. Further, if a user regularly stops at a long traffic signal on her way to work, the traffic signal may be clustered to a visited place. Thus, points on the user's commute may be filtered out.

Location-based services may also report where a user spends her time during the week. For time spent at home, all pairs of consecutive points within a threshold distance of the home location may be collected. To eliminate the effect of a situation where no points are reported, a pair of points may only be used if they are within a certain time period, such as two hours. Time spent at work may be computed in a similar manner.

Time away from home or work may be computed by finding pairs of consecutive points which are not near home and not near work, and are within a distance threshold. In embodiments, choosing a constant distance threshold may not work, since some people work very close to their home. Thus, the distance threshold may be capped to a quarter of the distance between the user's home and work locations. If a user has gaps in his location history, the summation of the times computed for a week may be less than seven days. These gaps may be ignored.

Normalizing Commute Routes

Figure 3:
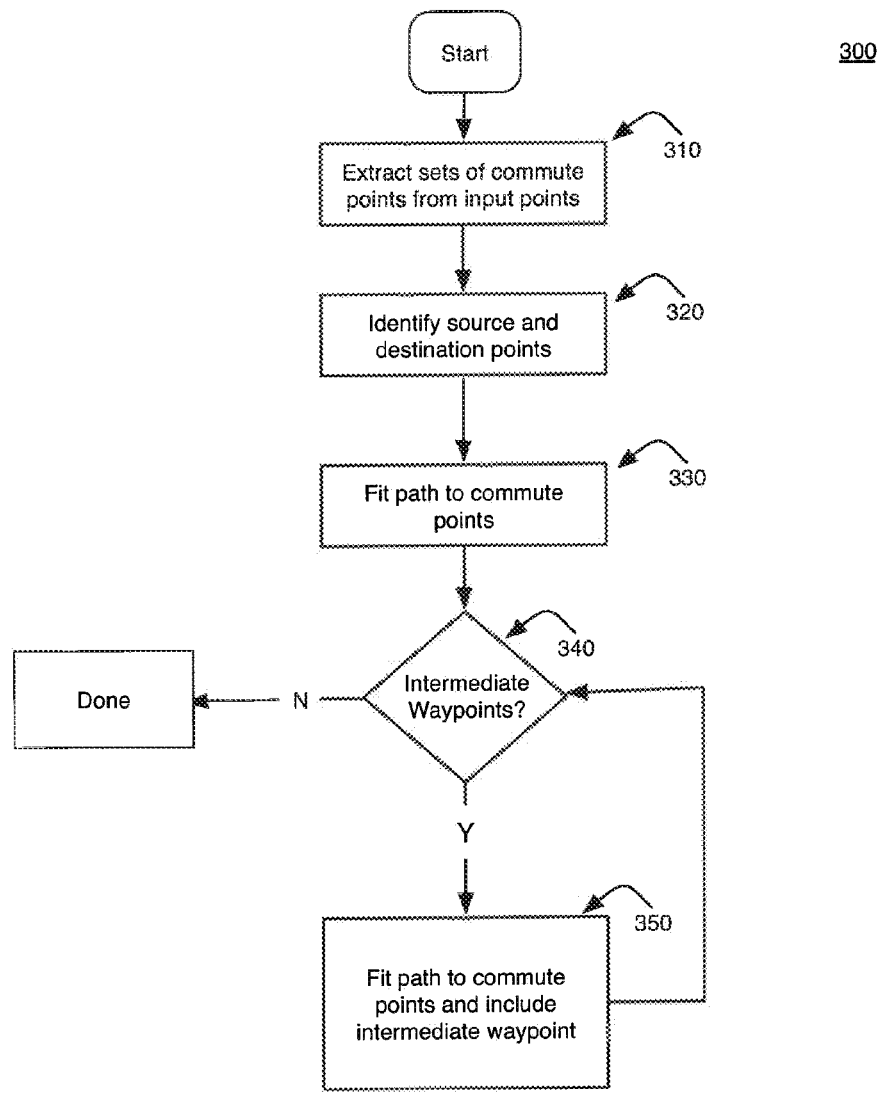
FIG. 3 is a flow diagram of an exemplary method of normalizing commute routes in accordance with an embodiment.

A user's driving commute patterns may also be determined by analyzing her location history. However, analyzing driving commute patterns may be difficult, because points may be reported infrequently. Further, the path between reported points may need to be derived. The accuracy of points along the commute may be very low, and thus snapping points to the road the user is likely to be on may be necessary. Commutes may be analyzed and normalized in multiple steps. FIG. 3 is a flow diagram of a method 300 for normalizing a commute path, according to an embodiment.

At block 310, sets of commute points are extracted from the input points. Given a source and destination, the points from the user's location history which likely occurred on the user's driving commute from the source to the destination are extracted. As above, in order to preserve the user's privacy, the user's location history may be obtained as part of an opt-in service. Thus, in embodiments, the user must actively wish to have her mobile phone or other device transmit her location to be stored as the user's location history. The user may control who can view her current location and location history and may, at any time, delete her location history. Consecutive points between the source and destination may be considered as part of a single commute if they meet various checks or filters. For example, points which may have occurred on the user's commute, but with low accuracy, may be filtered out. Further, the commute distance that would result from including the points must be reasonable. The duration of the commute must also be reasonable. Finally, the commute should be at a reasonable driving velocity.

At block 320, the source and destination points are identified. The source may represent the user's home location, while the destination may represent the user's work location. The source and destination may be determined by clustering algorithms and heuristics, as described above.

At block 330, a routing server used to compute driving directions may be queried to fit a path to the commute points. A routing server may typically be used, as described above, to compute driving destinations from a source to a destination. In embodiments, such a routing server may be used to determine routes according to a user's location history. Such a routing server may be known to one of ordinary skill in the art. Thus, at block 330, the routing server may be queried to determine a proposed route between the source and the destination.

The proposed route may not represent the user's actual commute, however. Points between the source and destination points identified at block 310 may be considered as candidate intermediate waypoints. Once candidate intermediate waypoints are identified, a determination is made as to whether to include any candidate intermediate waypoints in the normalized commute path. At block 340, a determination is made as to whether any candidate intermediate waypoints points exist outside of a threshold distance.

A threshold distance may specify whether to include a candidate intermediate waypoint. The threshold distance may specify, for example, that if a candidate intermediate waypoint is within 0.5 miles of the commute path, it should be included in the normalized commute path. If all of the points along the commute are within the threshold distance, the method may terminate and return this path. Thus, if the determination at block 340 identifies that a candidate intermediate waypoint exists outside of the threshold distance, the candidate intermediate waypoint which is furthest away from the path may be used as an intermediate waypoint.

If such a point exists, the routing server may be queried again at block 350 to determine a route from the source point, to the intermediate waypoint, and terminating at the destination point.

In embodiments, a determination may be made as to whether a further intermediate waypoint exists in the remaining candidate points. If a further intermediate waypoint exists, then the routing server may be queried to generate a route including the additional intermediate waypoint.

If the routing server fails, the intermediate waypoint may not be valid. For example, the waypoint may be in water. Invalid waypoints may be dropped. Blocks 340 and 350 may be repeated until all intermediate waypoints in the set of commute points are identified. That is, blocks 340 and 350 may be repeated until all commute points are within the threshold distance. The route that connects all commute points may be a normalized commute route for the user, and may be used as described herein.

Figure 4A:
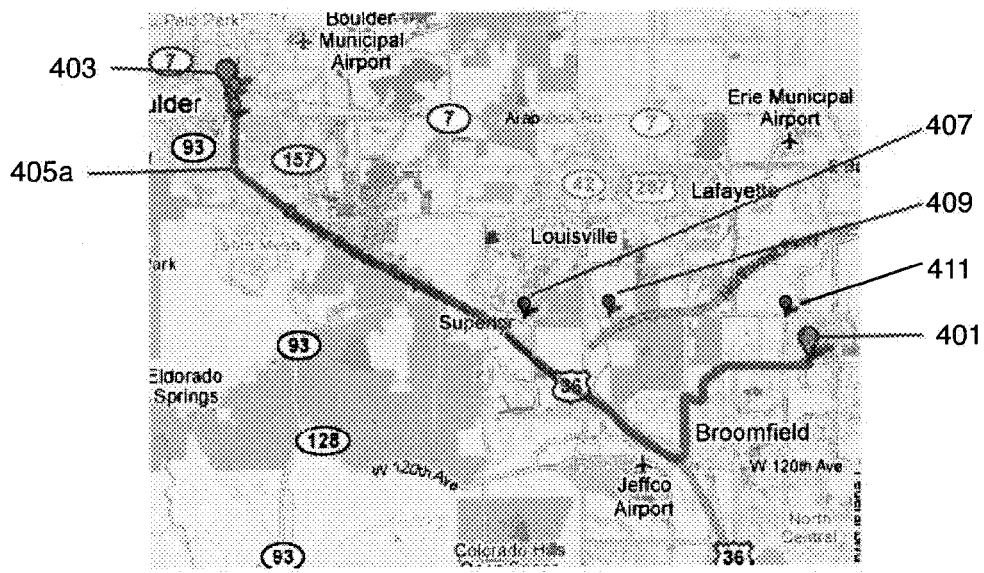
FIGS. 4A and 4B are images of exemplary normalized commute routes.
Figure 4B:
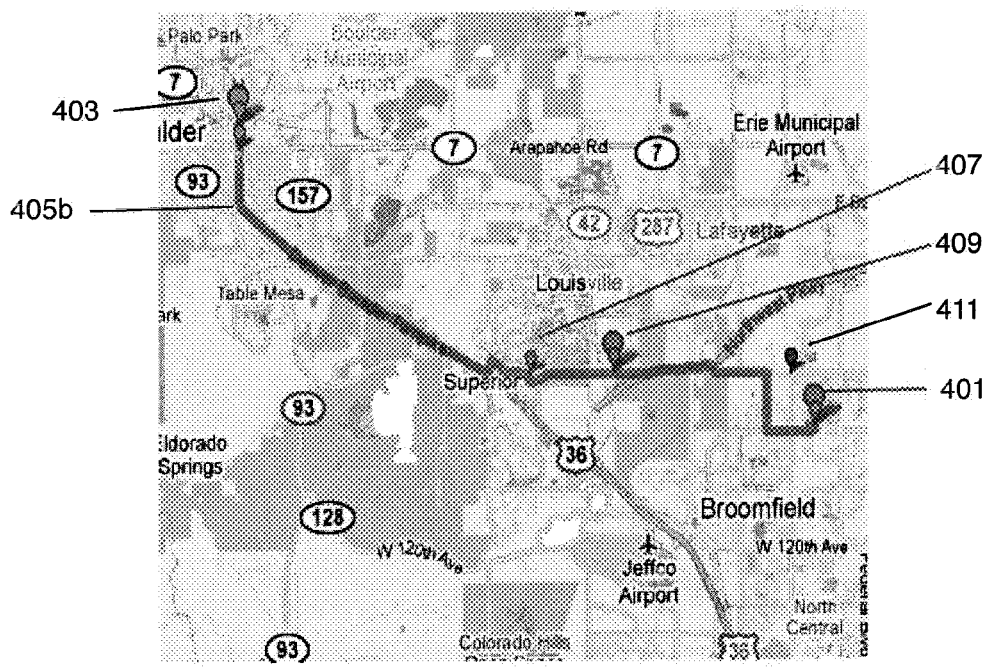

FIGS. 4A and 4B are examples of iterations of method 300. FIG. 4A, for example, is an example of an execution of method 300 after blocks 310, 320, and 330. As seen in FIG. 4A, large markers 401 and 403 may represent the user's source and destination points. The line 405a may represent the initial path between the two points determined by the routing server. FIG. 4A further includes small markers 407, 409, and 411, which represent additional points from the user's location history.

FIG. 4B may represent an execution of method 300 after blocks 310 through 350. In the example of FIG. 4B, blocks 340 and 350 of method 300 have identified the point corresponding to marker 409 as an intermediate waypoint since this point was determined to be outside of a threshold distance of the route 405a. In accordance with an embodiment, the routing server is queried with the identified intermediate waypoint, as represented by small marker 409. Thus, the routing server may use this intermediate waypoint when determining the normalized commute route 405b, as illustrated in FIG. 4B. For example, the points in the user's location history represented by small markers 407 and 411 may not be included in the normalized commute path 405b if these points are determined to be within a threshold distance of normalized commute route 405b.

Clustering Normalized Commute Routes

Given a bag of normalized commute routes and the time intervals the commutes occurred, normalized commute routes maybe clustered to determine the most frequent commutes. A bag may be a collection of commute routes, wherein the commute routes need not be distinct from one another. That is, a bag of commute routes may contain duplicate commute routes. Two commutes may be deemed temporally close if they begin and end within a particular threshold of each other on the same day of the week. Similarly, two commutes may be deemed spatially close if their Hausdoff distance is within a threshold. Leader-based clustering may be used to generate commute clusters.

Figure 5:
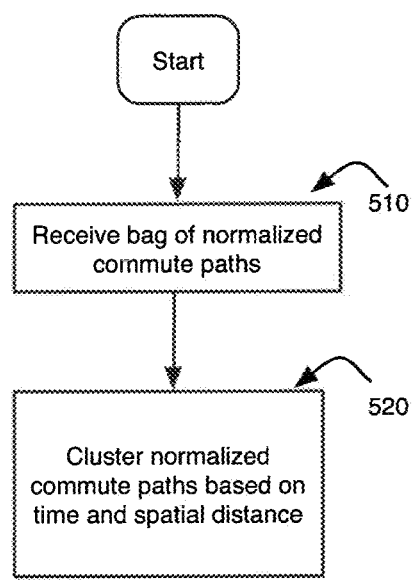
FIG. 5 is a flow diagram of an exemplary method for clustering normalized commute routes, in accordance with an embodiment.

FIG. 5 is a flow diagram of a method 500 for clustering normalized commute paths, according to an embodiment.

At block 510, a bag of normalized commute paths is received. Each normalized commute path may be a result of method 300 of FIG. 3, as described above.

At block 520, the distance between normalized commute paths is used to determine whether to cluster normalized commute paths together. The distance between normalized commute paths may be measured both by the time between normalized commute paths and the Hausdorff distance between normalized commute paths. The Hausdorff distance may represent the spatial distance between two normalized commute paths. Block 520 may be repeated until all normalized commute paths are clustered together.

The largest cluster generated as a result of method 500 may be the user's most common route taken by the user. Method 500 may be performed for normalized commute paths on each day of the week. The user's most common route for a particular day may be used in various applications as described below.

System

Figure 6:
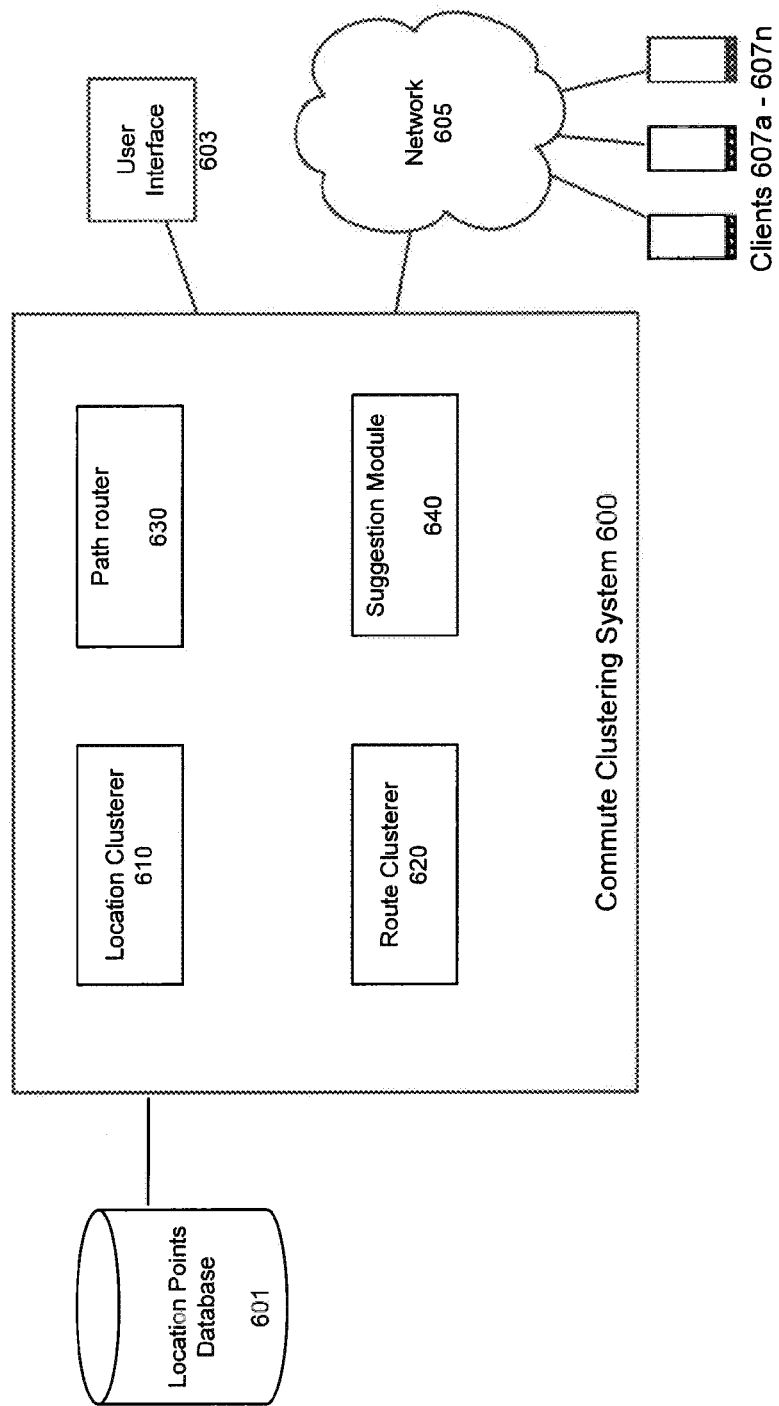
FIG. 6 is a diagram of a system in accordance with an embodiment.

FIG. 6 is a diagram of an exemplary commute clustering system 600. Commute clustering system 600 may receive location points from location points database 601. Location points database 601 may be implemented in any type of persistent memory.

Commute clustering system 600 includes location clusterer 610. Location clusterer 610 may use a combination of leader-based clustering, mean-shift clustering, and adaptive radius clustering, as described herein, to determine various visited locations for a user, from location points stored in location points database 601, in accordance with embodiments. Location clusterer 610 may also use heuristics to determine a user's home and work locations.

Commute clustering system 600 also includes path router 630. Path router 630 may be used in conjunction with locations determined by location cluster module 610 to generate normalized commute routes, in accordance with method 300 of FIG. 3.

Commute clustering system 600 also includes route clusterer 620. Route clusterer 620 may operate as set forth in method 500 of FIG. 5 to cluster normalized commute paths generated by routing server 630.

Commute clustering system 600 also includes suggestion module 640. Suggestion module 640 may use paths generated by routing server 630 and clusters generated by route cluster module 620 to produce suggestions to users, as set forth below.

Commute clustering system 600 may be connected to user interface 603. User interface 603 may be used to set various thresholds in accordance with embodiments. Commute clustering system 600 may also be connected to network 605, which may be a local area network or wide area network such as the Internet. Network 605 may provide connectivity to clients 607, which may use the various modules of commute clustering system 600 as described herein. Clients 607 may also send location points to location points database 601 via network 605.

Example Applications

Various applications may be implemented using the user's location history. In embodiments, passive location based services are implemented as an opt-in service, where the user must actively wish to have her mobile phone or other device transmit her location. The user may also control who can view her current location and location history. At any time, the user may opt-out and may be given the option to delete her location history.

Airplane flights may be detected if the user appears to teleport from a location near one airport to a location near another airport. Various checks may be performed for the length and duration of the flight, and locations near home and work may be filtered out of the location history points. This may be because otherwise, if a person lives or works near a small or lightly used airport, false positive flights may appear for her if there is a gap in the location history.

Consecutive locations far away from the user's home may be found to determine points that belong to a trip. The duration of the trip may be determined as well, and the places visited by the user may be determined using embodiments disclosed herein.

Various applications may be possible once commute paths are normalized and clustered as described with respect to method 300 of FIG. 3 and method 500 of FIG. 5.

From the clustered commute paths as described with respect to method 500, predictions may be made as to when a user is expected to drive, and what path he is expected to take. A traffic server may be queried in the time window the user is expected to take a commute, which may alert the user of traffic incidents along the route and suggest alternate routes.

Carpool matching may also be possible. Since the user's normal commute windows and paths are known, users may be matched who are looking for carpool partners. For example, users may be matched if their source and destination locations are within a particular distance threshold, and further if their departure times are within a time threshold. As described above, the user need not explicitly signal his commute path. Further, depending on embodiments, infrequently sampled locations with coarse accuracy, such as those determined by way of wi-fi signature, may be sufficient for carpool matching.

Location based reminders may also be possible. Since the places that the user usually visits are known, the user may be able to set up reminders on such locations. For instance, a reminder may be set that specifies "remind me to buy milk when I arrive at the grocery store." Further, location based reminders may take into account that a user visits a particular location on the same day of the week. Thus, for example, if a user visits her grocery store every Wednesday, location based reminders can be set to remind the user every Wednesday of items on her grocery list.

Recommendations may also be possible. Based on the user's location history, the user's interests may be inferred, and recommendations for businesses that are potentially interesting to the user may be suggested to the user.

Further, alerts may be provided to the user if special events may be taking place at places where the user typically visits. For example, the user may be alerted if a sale is upcoming at a store she frequently visits, or if the gym she frequently visits is to close on a particular day.

Computer System

Figure 7:
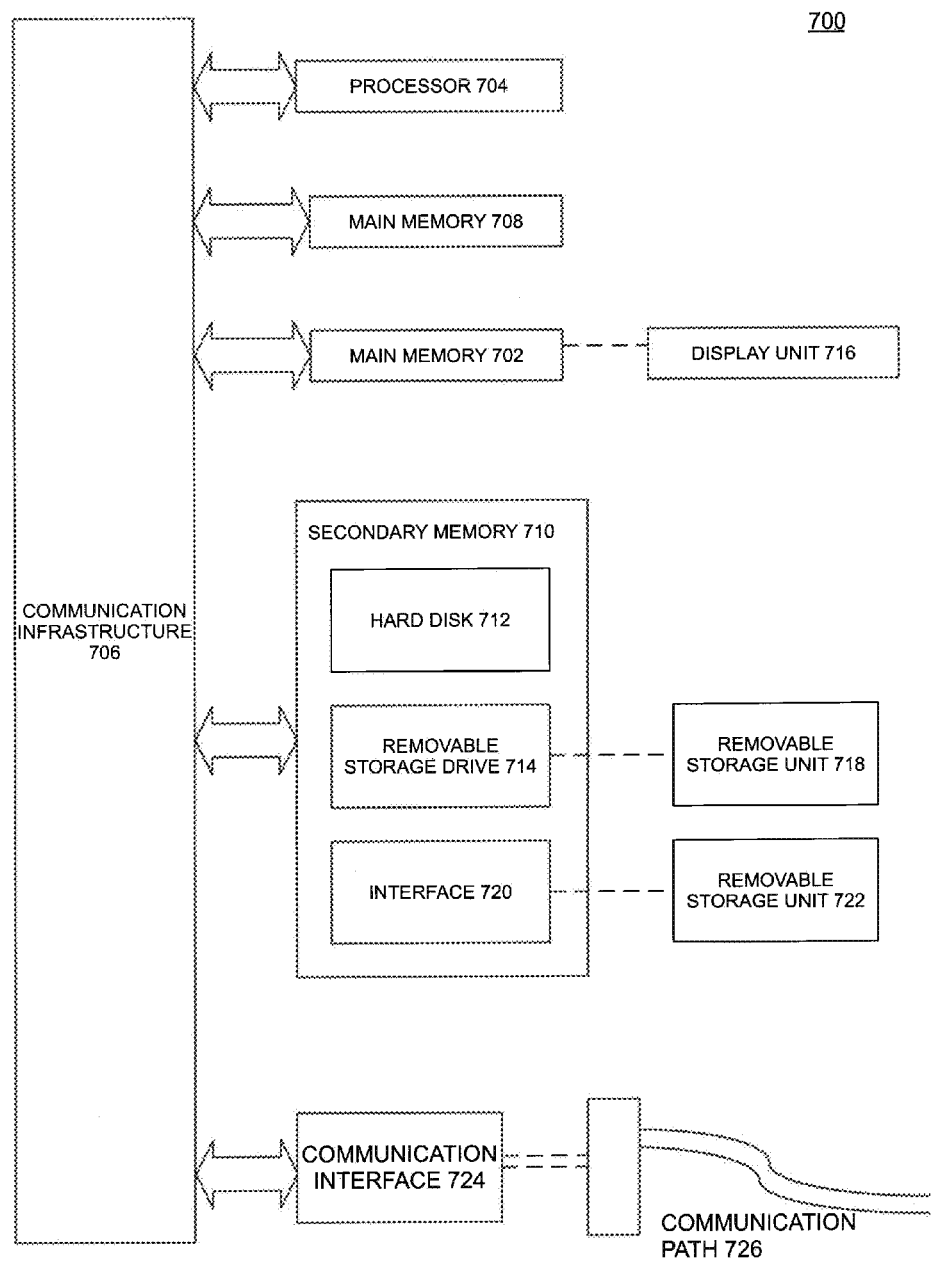
FIG. 7 is a diagram of a computer system that may be used to implement embodiments.

FIG. 7 illustrates an example computer system 700 in which embodiments of the present invention, or portions thereof, may be implemented as computer-readable code. For example, commute clustering system 600 may be implemented in computer system 700 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-6.

If programmable logic is used, such logic may execute on a commercially available processing platform or a special purpose device. A person skilled in the relevant art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general-purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory (RAM), and may also include a secondary memory 710. Secondary memory 710 may include, for example, a hard disk drive 712, removable storage drive 714. Removable storage drive 714 may comprise a floppy disk drive, a magnetic tape drive, an optical disk drive, a flash memory, or the like. The removable storage drive 714 reads from and/or writes to a removable storage unit 718 in a well-known manner. Removable storage unit 718 may comprise a floppy disk, magnetic tape, optical disk, etc., which is read by and written to by removable storage drive 714. As will be appreciated by persons skilled in the relevant art, removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Computer program medium and computer usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement the present invention as discussed herein. In particular, the computer programs, when executed, enable processor device 704 to implement the processes of the present invention, such as the stages in the method illustrated by flowchart 300 of FIG. 3 discussed above. Accordingly, such computer programs represent controllers of the computer system 700. Where the invention is implemented using software, the software may be stored in a computer program product and loaded into computer system 700 using removable storage drive 714, interface 720, and hard disk drive 712, or communications interface 724.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

Conclusion

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for route normalization, comprising:
   (a) identifying, by a processor, a set of historical location points associated with a user's location history and previously generated based on one or more location input sources, each historical location point in the set of historical location points associated with a timestamp;
   (b) determining, by the processor, a source point from the set of historical location points;
   (c) determining, by the processor, a destination point from the set of historical location points;
   (d) generating, by the processor, a first route from the determined source point to the determined destination point;
   (e) determining, by the processor, that the set of historical location points includes an intermediate waypoint that is more than a predetermined distance away from the generated first route; and
   (f) generating, by the processor, a second route from the source point to the destination point in response to determining that the set of historical location points includes the intermediate waypoint more than a predetermined distance away from the generated first route, the second route comprising a normalized route between the source point and destination point that includes the identified intermediate waypoint.

2. The method of claim 1, wherein step (d) further comprises querying a routing server to generate a first route from the determined source point to the determined destination point, and wherein step (f) further comprises querying a routing server to generate a second route from the source point to the destination point based on the intermediate waypoint, the second route representing a normalized version of the first route that includes the intermediate waypoint.

3. The method of claim 1, wherein step (b) further comprises:
   (i) clustering one or more location points in the set of historical location points based on a distance between two historical location points; and
   (ii) determining the source point from the clustered location points and a heuristic, wherein the heuristic comprises desired criteria of the source point.

4. The method of claim 1, wherein step (c) further comprises:
   (i) clustering one or more location points in the set of historical location points based on a distance between two historical location points; and
   (ii) determining the destination point from the clustered location points and a heuristic, wherein the heuristic comprises desired criteria of the destination point.

5. The method of claim 1, further comprising filtering out location points based on a set of criteria.

6. The method of claim 1, wherein each historical location point in the set of historical location points is associated with a location point source, and wherein each historical location point is further associated with an accuracy radius based on the location point source.

7. The method of claim 6, wherein the location point source is one of a Global Positioning System source, a wi-fi signature source, or a cell tower location source.

8. A system for normalizing commute routes, comprising:
   a processor configured to:
      identify a set of historical location points generated from a user's location history, each historical location point associated with a timestamp and a location point source;
      determine a home point from the set of historical location points based on the timestamps;
      determine a work point from the set of historical location points based on the timestamps; and request, from a routing server, a first proposed route between the work point and the home point;

determine whether the set of historical location points includes a historical location point that is more than a threshold distance away from the first proposed route between the work point and the home point; and in response to said determining:

if the set of historical location points includes the historical location point that is more than the threshold distance away then request, from the routing server, a second proposed route between the work point, the historical location point that is more than the threshold distance away, and the home point, and define the second proposed route as a normalized commute route between the home point and the work point;

if the set of historical location points does not include one or more historical location points that is more than the threshold distance away then define the first proposed route as the normalized commute route between the home point and the work point.

9. The system of claim 8, wherein the processor is further configured to:

cluster one or more location points in the set of historical location points based on a distance between two historical location points; and determine the source point from the cluster and a heuristic, wherein the heuristic comprises desired criteria of the source point.

10. The system of claim 8, wherein the processor is further configured to:

cluster one or more location points in the set of historical location points based on a distance between two historical location points; and determine the destination point from the cluster and a heuristic, wherein the heuristic comprises desired criteria of the destination point.

11. The system of claim 8, wherein the processor is further configured to filter out location points in the set of historical location points, based on received criteria.

12. The system of claim 8, wherein each historical location point is associated with an accuracy radius.

13. The system of claim 8, wherein the location point source is one of a Global Positioning System source, a wi-fi signature source, or a cell tower location source.

14. A non-transitory computer readable storage medium having instructions stored thereon that, when executed by a processor, cause the processor to perform operations including:

(a) identifying a set of historical location points associated with a user's location history and previously generated based on one or more location input sources, each historical location point in the set of historical location points associated with a timestamp;

(b) determining a source point from the set of location points;

(c) determining a destination point from the set of location points;

(d) generating a first route from the source point to the destination point;

(e) determining an that the set of historical location points includes an intermediate waypoint that is more than a threshold distance away from the generated first route; and (f) generating a second route from the source point to the destination point in response to determining that the set of historical location points includes the intermediate waypoint more than a predetermined distance away from the generated first route, the second route comprising a normalized route between the source point and destination point that includes the identified intermediate waypoint.

15. The non-transitory computer readable storage medium of claim 14, the operations (d) further comprising querying a routing server to generate the first route from the determined source point to the determined destination point, and the operations (f) further comprising querying a routing server to generate the second route from the source point to the destination point based on the intermediate waypoint.

16. The non-transitory computer readable storage medium of claim 14, the operations (b) further comprising:

(i) clustering one or more location points in the set of historical location points based on a distance between two historical location points; and (ii) determining the source point from the clustered location points and a heuristic, wherein the heuristic comprises desired criteria of the source point.

17. The non-transitory computer readable storage medium of claim 14, the operations (c) further comprising:

(i) clustering one or more location points in the set of historical location points based on a distance between two historical location points; and (ii) determining the destination point from the cluster and a heuristic, wherein the heuristic comprises desired criteria of the destination point.

18. The non-transitory computer readable storage medium of claim 14, the operations further comprising filtering out location points based on received criteria.

19. The non-transitory computer readable storage medium of claim 14, wherein each historical location point is further associated with an accuracy radius based on the location point source.

20. The non-transitory computer readable storage medium of claim 14, wherein the location point source is one of a Global Positioning System source, a wi-fi signature source, or a cell tower location source.

* * * * *